United States Patent
Natan et al.

(10) Patent No.: US 6,178,496 B1
(45) Date of Patent: Jan. 23, 2001

(54) SYSTEM FOR CONVERTING INSTRUCTIONS, AND METHOD THEREFORE

(75) Inventors: Rami Natan, Ramat-gan; Alex Miretsky, Haifa; Vitaly Sukonik, Hedera, all of (IL)

(73) Assignee: Motorola, Inc., Schaumburg, IL (US)

( * ) Notice: Under 35 U.S.C. 154(b), the term of this patent shall be extended for 0 days.

(21) Appl. No.: 09/251,161

(22) Filed: Feb. 17, 1999

(51) Int. Cl.[7] .............................. G06F 9/30; G06F 9/315
(52) U.S. Cl. .......................... 712/210; 708/203; 712/23
(58) Field of Search .................................. 382/307, 202; 708/203, 413, 107, 653, 650; 710/130; 712/210, 205–209, 23, 22, 21, 24, 233

(56) References Cited

U.S. PATENT DOCUMENTS

| | | | |
|---|---|---|---|
| 4,853,930 | 8/1989 | Shimada | 371/43 |
| 5,408,625 | 4/1995 | Narita et al. | 395/375 |
| 5,603,022 | * 2/1997 | Ng et al. | 708/203 |
| 5,632,024 | 5/1997 | Yajima et al. | 395/381 |
| 5,655,098 | * 8/1997 | Wih et al. | 712/210 |
| 5,673,209 | * 9/1997 | Heiny et al. | 708/203 |

FOREIGN PATENT DOCUMENTS 0 745 932   12/1996   (EP).

* cited by examiner

*Primary Examiner*—Daniel H. Pan (57) ABSTRACT

A converter (130) comprises a multiplex-buffer (410) at a bus (120), a decoder (420), an output buffer (430) and a comparator (440). The multiplex-buffer (410) forwards $V_{MAX}$ bits (260) of Huffman coded code portions (222) from the bus (120) to the decoder (410). The $V_{MAX}$ bits (260) can comprise further bits set to logical "1" or "0" at random. On a control output (414), the multiplex-buffer (410) provides a signal K identifying which of the $V_{MAX}$ bits are valid or invalid. The decoder (420) maps the $V_{MAX}$ bits (260) into a preliminary bit cluster (426) and indicates a code length V regardless whether some or all bits are valid or not. The comparator (440) checks V and K and allows the output buffer (430) to copy the preliminary bit cluster (426) into instruction portions (212) only when the code length fits the identification of valid bits.

12 Claims, 4 Drawing Sheets

SYSTEM FOR CONVERTING INSTRUCTIONS, AND METHOD THEREFORE

FIELD OF THE INVENTION

The present invention generally relates to computer systems, and, more particularly, to a converter which is part of the system, and to a method therefore.

BACKGROUND OF THE INVENTION

Computers can be classified into complex instruction set computers (CISC) and reduced instruction set computers (RISC). The CISC machines conveniently read instruction words with variable length (e.g., 8 bit to 64 bit) in a single software program, wherein the RISC machines often read instruction words with constant length (e.g., 32 bit). The number of possible bit combinations which form the instruction words is often high for CISC and low for RISC. Among others, these features make RISC especially suitable for the integration of processor and memory into a single chip in embedded systems. However, a software program written for RISC may require more memory space than a software program with the same function which runs on a CISC machine.

To save memory space, instructions are conveniently stored in compressed form wherein code portions have variable lengths. However, such systems need real time converters to expand the instructions prior to execution. The present invention seeks to provide a converter which provides a high decoding rate for such instructions.

BRIEF DESCRIPTION OF THE DRAWINGS

FIGS. 4–5 are simplified diagrams illustrating a method of the present invention to operate the converter of FIG. 3; wherein FIG. 4 is a flowchart diagram and FIG. 5 is a diagram of a bit stream.

DETAILED DESCRIPTION OF A PREFERRED EMBODIMENT

Some portions of this description are presented in terms of symbolic representations. Such representations are used by persons skilled in data processing to more effectively convey the substance of their work to other persons. Among others, the representations stand for physical manipulations of physical quantities. Usually, these quantities take the form of electrical, optical, magnetic or other signals capable of being stored, transferred, combined, compared, and otherwise manipulated. It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operation are machine operations. In all cases the distinction between the method operations in operating a computer and the method of computation itself should be considered.

Figure 1:
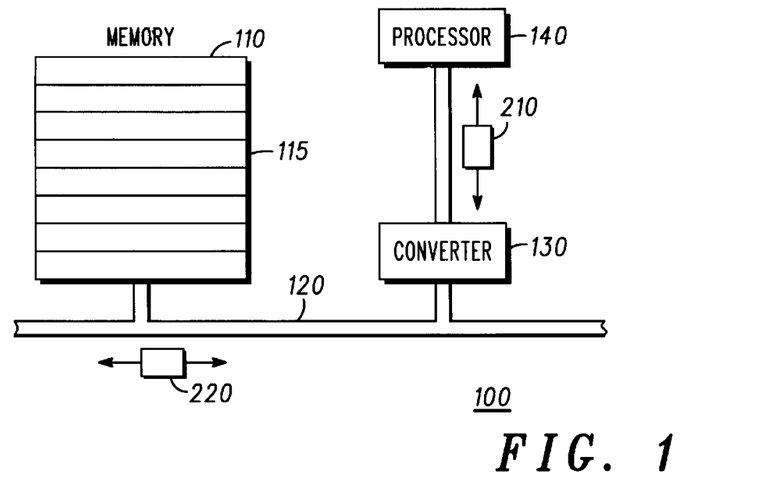
FIG. 1 illustrates a simplified block diagram of a computer system according to the present invention.

FIG. 1 illustrates a simplified block diagram of computer system 100 of the present invention. System 100 comprises memory 110, bus 120, converter 130, and processor 140. Memory 110 sends code words 220 (details in FIG. 2) in, preferably, compressed form, to converter 130 via bus 120. Preferably, converter 130 is an asynchronous Huffman decoder (details later) which provides a high decoding rate. Converter 130 decodes code words 220 and sends instruction words 210 in, preferably, expanded form, to processor 140.

A reverse operation is also possible: Processor 140 sends instruction words 210 to converter 130; converter 130 codes instruction words 210 into code words 220; and bus 120 forwards code words 220 to memory 110.

Processor 140 executes the instructions represented by instruction words 210. For convenience of explanation, it is assumed that converter 130 provides or receives a single instruction word 210 at one time. Bus 120 can carry portions of code words 220 in parallel or serially. Also, bus 120 can simultaneously carry portions which belong to different code words 220. Memory 10 has a plurality of memory lines 115. It is an advantage of the present invention, that instructions of variable length stored in lines 115 do not substantially slow down the operation of system 100 even if the instructions are selected by jumping addresses. For simplicity of explanation, it is assumed that data bus 120 carries the contents of a single line 115 at one time. Computer system 100 can comprise other elements, e.g., address busses, well known in the art. For simplicity, such elements are not illustrated.

Figure 2:
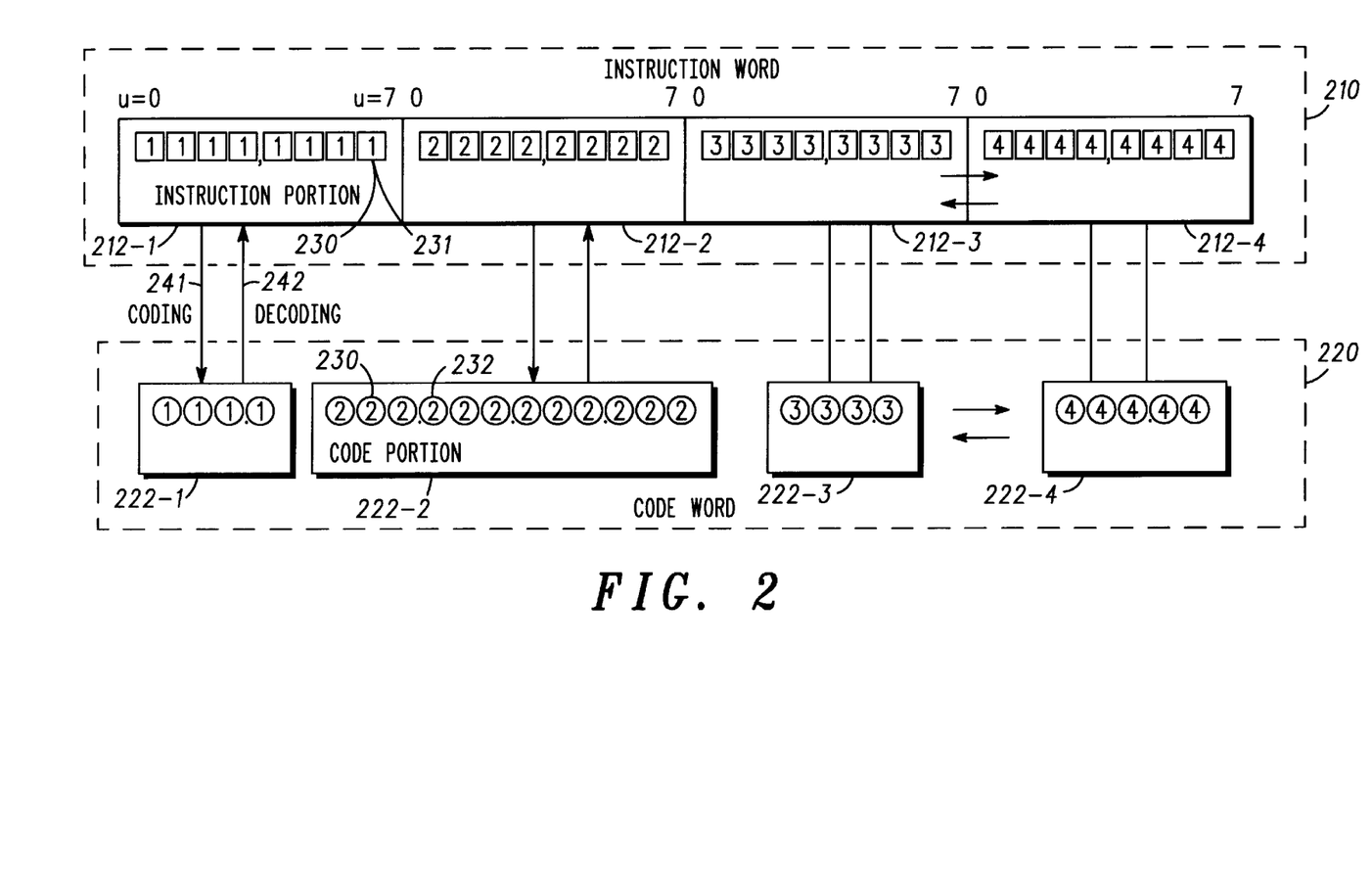
FIG. 2 illustrates simplified block diagrams of an instruction word and a code word.

FIG. 2 illustrates simplified block diagrams of instruction word 210 (dashed frame) and code word 220 (dashed frame). In FIG. 2 and in other figures, data units 230, which are not further divided, have symbols ①②③④ or ○, Ø or have square symbols with or without numbers (in the text as ①//②//③//④/ and/○/). The numbers in the circle or square symbols (e.g., 1, 2, 3, 4) are collectively referred to by portion index "p". Indices "p" are sometimes left out for simplicity. Preferably, data units 230, for convenience hereinafter "bits", represent binary quantities with logical "0" and "1" values, as the case may be. But this is only a convention used for the simplicity of explanation. Those of skill in the art, are able, based on the description herein to use other values. The actual values (e.g., "0" or "1") of bits 230 are not important for the description. The term "instruction" used alone or in combination with other terms is intended to be a convenient label for any information which is supplied to a processor, such as commands, numerical data or text data, and other kind of data.

Conveniently, instruction word 210 has a predefined number of P*U instruction bits 231 (e.g., 32 bits) which have symbols /①//②//③//④/ (also, /①/-bits, /②/-bits, etc., in general /○/-bits). Instruction word 210 is divided into P instruction portions 212-p (conveniently p=1 to P). Preferably, all instruction portions 212-p each comprise an equal number of U(p)=U instruction bits 231. For convenience, groups of four /○/-bits are separated by commas. For example and not intended to be limiting, instruction word 210 has P=4 instruction portions 212-p: e.g., instruction portion 212-1 with U(1)=8 instruction /①/-bits, portion 212-2 with U(2)=8 instruction /②/-bits, portion 212-3 with U(3)=8 instruction /③/-bits and portion 212-4 with U(4)=8 instruction /④/-bits. For convenience, instruction bit indices u (e.g., u=0 to U−1=7) within each instruction portion 212-p are given at the top of the blocks which symbolize instruction portions 212-p. Instruction word 210 is illustrated by a single block of instruction portions 212-1 to 212-P indicating that they are, preferably, used in combination.

Instruction word 210 can be transformed to code word 220 with P code portions 222-p (p=1 to P), and vice versa. Code portions 222-p comprise code bits 232 (symbols ① ② ③ ④). As shown by unidirectional arrows, coding 241 transforms a single instruction portion 212-p to a single code portion 222-p, and decoding 242 transforms a single code portion 222-p to a single instruction portion 212-p. Code portions 222-p can be conveniently stored, transferred, or otherwise manipulated separately.

Preferably, coding 241 is performed with compression so that code portion 222-p has less bits 232 than its corresponding instruction portion 212-p. For example, coding 241 has reduced the number of bits from U(1)=8/①/-bits in instruction portion 212-1 to V(1)=4 ①-bits in code portion 222-1. This bit reduction is convenient, but not essential: For example, instruction portion 212-2 (with U(2)=8/②/-bits) can be coded to code portion 222-p with V(2)=11 ②-bits. Decoding 242 is, preferably, performed by expanding, i.e. increasing the number of bits. For example, P=4 code portions 222-p have the following numbers of bits: code portion 222-1 with V(1)=4 code ①-bits, code portion 222-2 with V(2)=11 ②-bits, code portion 222-3 with V(3)=4 ③-bits, and code portion 222-4 with V(4)=5 ④-bits (generally also ○-bits). Groups of three or less ○-bits are conveniently separated by dots.

The number of code bits 232 in each code portion 222-p is limited by a minimum number $V_{MIN}$ ("bounded code") and the maximum number $V_{MAX}$, that is:

$$V_{MIN} \leq V(p) \leq V_{MAX}, \quad (1)$$

with the symbol ≦ for smaller than or equal to. In the example used for explanation herein, V(p) has the following values:

$$4 < V(p) \leq 11, \quad (2)$$

for all p (p=1 to P). Some instruction portions 212-p can be coded such that some code portions 222-p (e.g., portions with V(p)>U(p)) can include or duplicate instruction portions 212-p.

Methods and devices for coding and decoding are well known in the art. The following reference [1] gives an introduction to coding and decoding: Bernard Sklar: "DIGITAL COMMUNICATIONS Fundamentals and Applications", published by Prentice Hall, Englewood Cliffs 1998, ISBN 0-13-211939-0, especially chapter 11.6 "Source Coding" on pages 595–667. Therefore, persons of skill in the art are able, based on the description herein, to practice the present invention using known coders and decoders without the need for further explanation. Conveniently, code words 220 used in the present invention are Huffman coded (see sub-chapter 11.6.2 of [1] with a coding tree). The Huffman code is a prefix-free code (e.g., no additional bits between consecutive code portions required) and a variable length code (e.g., V(p) are different). Huffman coding (e.g., coding 241) is assumed only for the purpose of explaining the present invention and not intended to be limiting.

Apparatus and method of the present invention can be applied to code words 220 based on other coding 241 and decoding 242 procedures which are already known in the art or which will be developed in the future. The present invention can also be applied for encrypting or decrypting data. Preferably, the number of possible variations (e.g., $2^{(U*P)}$) of instruction bits 231 is adapted for RISC processors (e.g., processor 140).

Figure 3:
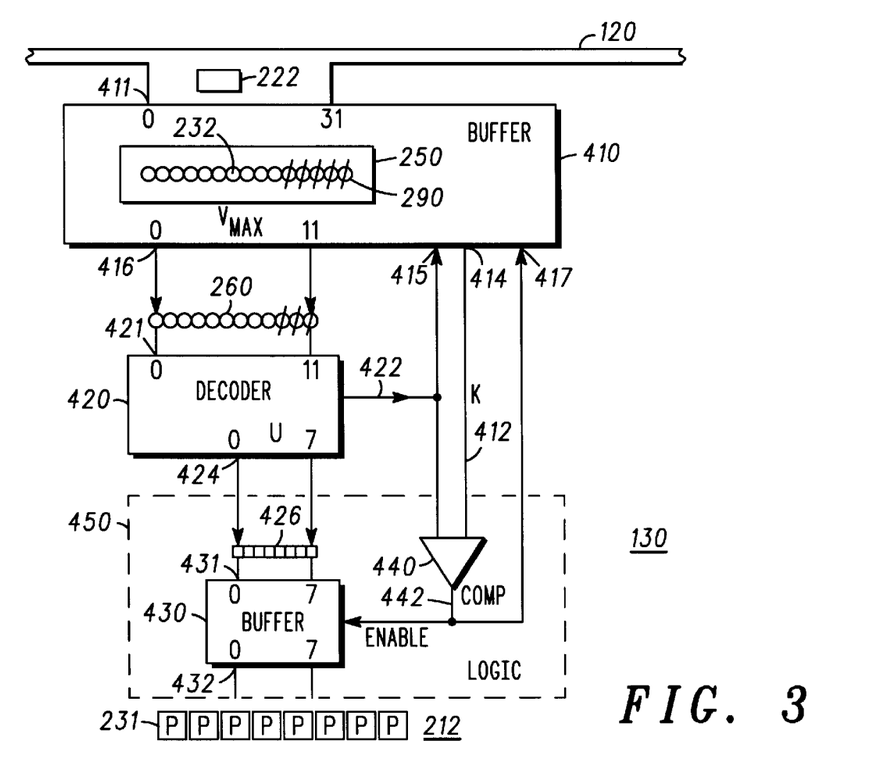
FIG. 3 illustrates a simplified block diagram of a converter used in the system of FIG. 1.

FIG. 3 illustrates a simplified block diagram of converter 130 used in computer system 100. Preferably, the converter elements are input buffer 410, output buffer 430, decoder 420, and comparator 440 ("COMP"). For convenience, FIG. 3 also illustrates bus 120 (cf. FIG. 1) as one of the elements. Output buffer 430 and comparator 440 form logic 450 (dashed frame).

For convenience of explanation, it is assumed that converter 130 decodes a single code portion 222 (at inputs 411 of buffer 410) into a single instruction portion 212 (at outputs 432 of buffer 430) in a single cycle. However, this is not essential. Persons of skill in the art are able, based on the description herein, to modify converter 130 without departing from the scope of the invention. Converter elements like decoder 420 and logic 450 can be provided in a twin-arrangement so as to decode two or more portions 222 in a single cycle. The operation of converter 130 is conveniently explained for decoding 242 (see FIG. 2). Persons of skill in the art can apply the present invention also for coding 241 without the need of further explanation.

The arrows on the lines indicate a preferred signal flow. For the purpose of explanation, inputs and outputs are identified by representative reference indices (e.g., inputs 411-0 to 411-31 in buffer 410 for J=32). These indices are intended to be non-limiting examples and are counted from 0 to the number of inputs/outputs minus 1. For simplicity, FIG. 3 shows the reference numbers only at input/outputs having index 0. Conveniently, total numbers of inputs, outputs, bits etc. are given by uppercase letters, e.g., J=32. Persons of skill in the art are able, based on the description herein, to implement converter 130 with elements which have higher, equal or lower input/output numbers than illustrated in FIG. 3. Also, the relation between the numbers is, unless specified in the following text, not essential for the present invention.

Figure 5:
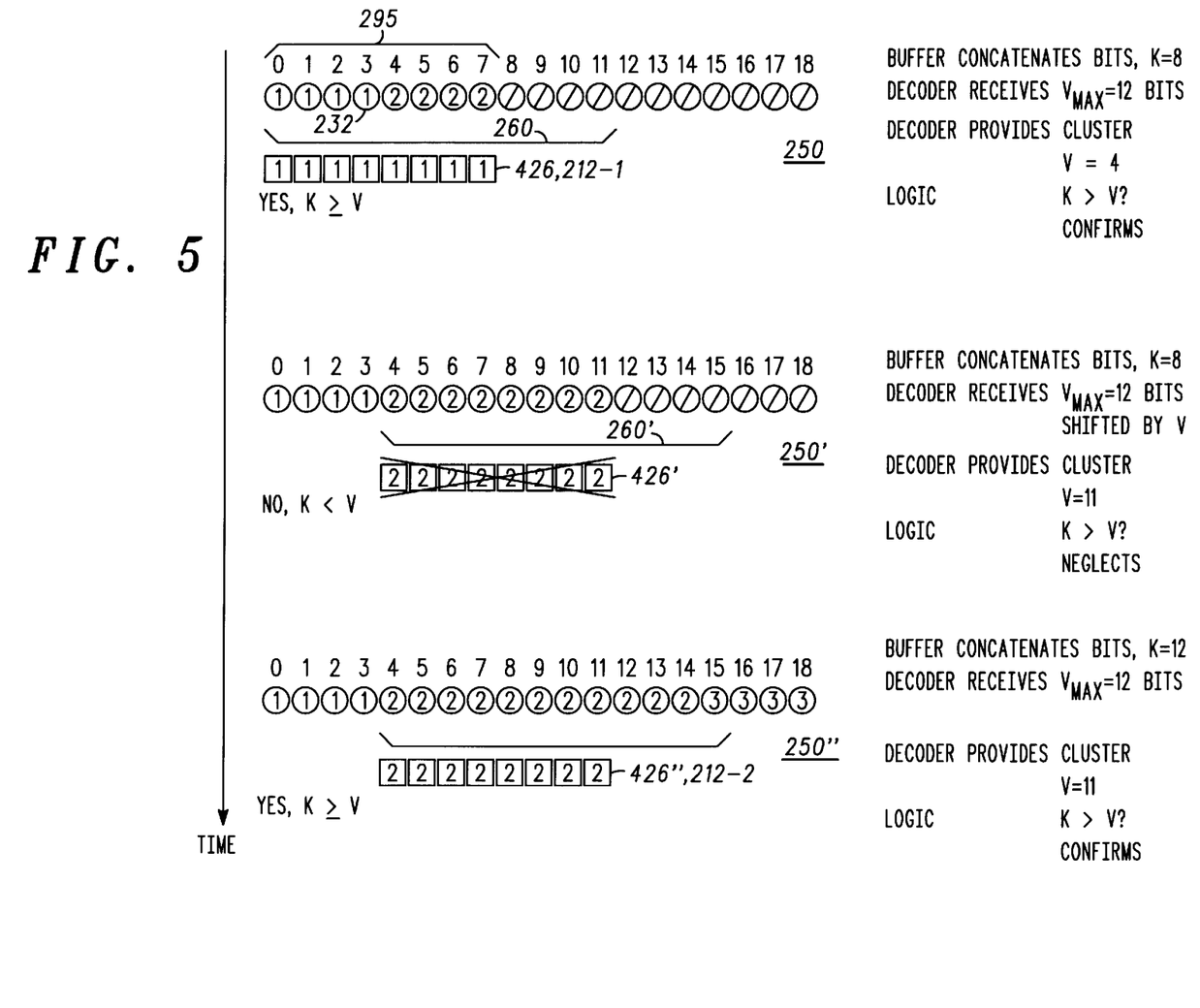

Input buffer 410 has inputs 411-0 to 411-(J−1) (e.g., for J=32) coupled to bus 120 to receive a number of L code bits 232 (cf. FIG. 2) from one or more code portions 222 at a time (J>$V_{MAX}$). Preferably, L is smaller than or equal to J (L≦J). A convenient value is L=19. Input buffer 410 has outputs 416-0 to 416-($V_{MAX}$−1) (e.g., $V_{MAX}$=12, cf. equation (2)) coupled to inputs 421-0 to 421-($V_{MAX}$−1), respectively, of decoder 420. Input buffer 410 concatenates code bits 232 (e.g., ①-bits, ②-bits, etc., or generally, ○-bits) from consecutive code portions 222 (e.g., portions 222-1 and 222-2) to bit stream 250 (hereinafter "stream"). Stream 250 can also comprise undefined or undetermined bits 290 ("Ø-bits"). At random, undefined bits 290 are at logical "1" or "0" or, optionally, at an unknown value. Stream 250 has at least N≧$V_{MAX}$ bits, but the total number N is not essential for the present invention. A convenient value is, for example, N=48 (e.g., N>J). Details for stream 250 are illustrated in FIG. 5. Stream 250 is conveniently illustrated as a combination of bits which are linearly lined up. This is convenient for explanation, but not essential for the present invention. The term "bit stream" is intended as a convenient label for any temporarily storage of bits in a buffer. The bits can be stored in a one-dimensional shift register, in a two dimensional matrix or by other means and arrangements.

From the N bits in stream 250, input buffer 410 multiplexes $V_{MAX}$ bits 232/290 as bit set 260 (hereinafter "set") to decoder 410. Persons of skill in the art can provide a multiplexer without further explanation. Set 260 can comprise "valid" code bits 232 (e.g., ①-②-○-bits) and undefined bits 290 (Ø-bits). The number K of code bits 232 in set 260 can be sufficient to form one or more code portions 222 or can be not sufficient. As explained later, buffer 410 provides new bit streams 260' and 260" with a bit shift.

At output 414, input buffer 410 provides an information which bits are code bits 232 ((①-②-○-bits) and which bits are undefined bits 290 (Ø-bits). Preferably, input buffer 410 provides this information by the number K which counts code bits 232 in stream 250. Persons of skill in the art are able, based on the description herein, to provide K without detailed explanation. An example is explained later.

At input 415, input buffer 410 receives shift information V telling which of the bits in stream 250 can be discarded when input buffer 410 provides next bit set 260' (see FIG. 5). Preferably, the shift information corresponds to the code length V determined in decoder 410 (details later).

At optional input 417, input buffer 410 optionally receives an enable signal ENABLE. For ENABLE=TRUE, buffer 410 performs bit shifting, and for ENABLE=FALSE, buffer 410 does not perform bit shifting. Buffer 410 can receive this information also via input 415 (e.g., when V set to V=0).

Decoder 420 receives set 260 and decodes (242) set 260 to intermediate cluster 426 (hereinafter "cluster") of instruction bits 231 (/○/-bits, cf. FIG. 2). Cluster 426 becomes available at outputs 424-0 to 424-(U-1) (e.g., U=8). In some cases, when set 260 comprises undefined bits 290 (Ø-bits), decoder 420 converts code bits 232 ((①-②-○-bits) and undefined bits 290 (Ø-bits) to a cluster which does not correspond to original coding 241. From the bits in set 260, decoder 424 provides code length V (at line 422). Code length V does sometimes not correspond to the number K of received valid bits. In other words, occasionally decoder 420 receives wrong input data and provides wrong clusters.

Output buffer 430 receives cluster 426 at inputs 431-0 to 431-(U-1). Upon receiving ENABLE=TRUE, from comparator 440, output buffer 430 transfers cluster 426 to instruction portion 212.

Comparator 440 receives K from buffer 410 (via line 412) and V from decoder 420 (via line 422). Conveniently, K is the number of code bits 232 which buffer 410 has sent to decoder 420. For K≧V, comparator 440 enables output buffer 430 (ENABLE=TRUE) and for K<V, comparator 440 disables output buffer 430 (ENABLE=FALSE). Preferably, the enable signal ENABLE is also supplied to input 417 of input buffer 410.

Having introduced V and ENABLE, updating of K is given by an example which is not intended to be limiting. When buffer 410 initially receives L code bits 232 from bus 120 (in one or more code portions 222) for the first time, K is set to K=L. After determining V by decoder 420 and establishing ENABLE=TRUE by comparator 440, buffer 410 can decrement K by V and substantially at the same time increment K by the next L code bits 232 which arrive from bus 120. Using "old" and "new" as convenient labels to indicate consecutive repetitions, this can be expressed as:

$$K(new)=K(old)-V+L \quad (3)$$

For simplicity, arithmetic circuitry within buffer 410 for calculating K is not illustrated. Persons of skill in the art, are able, based on the description herein, to provide K as described herein or by other means without the need of further explanation.

Figure 4:
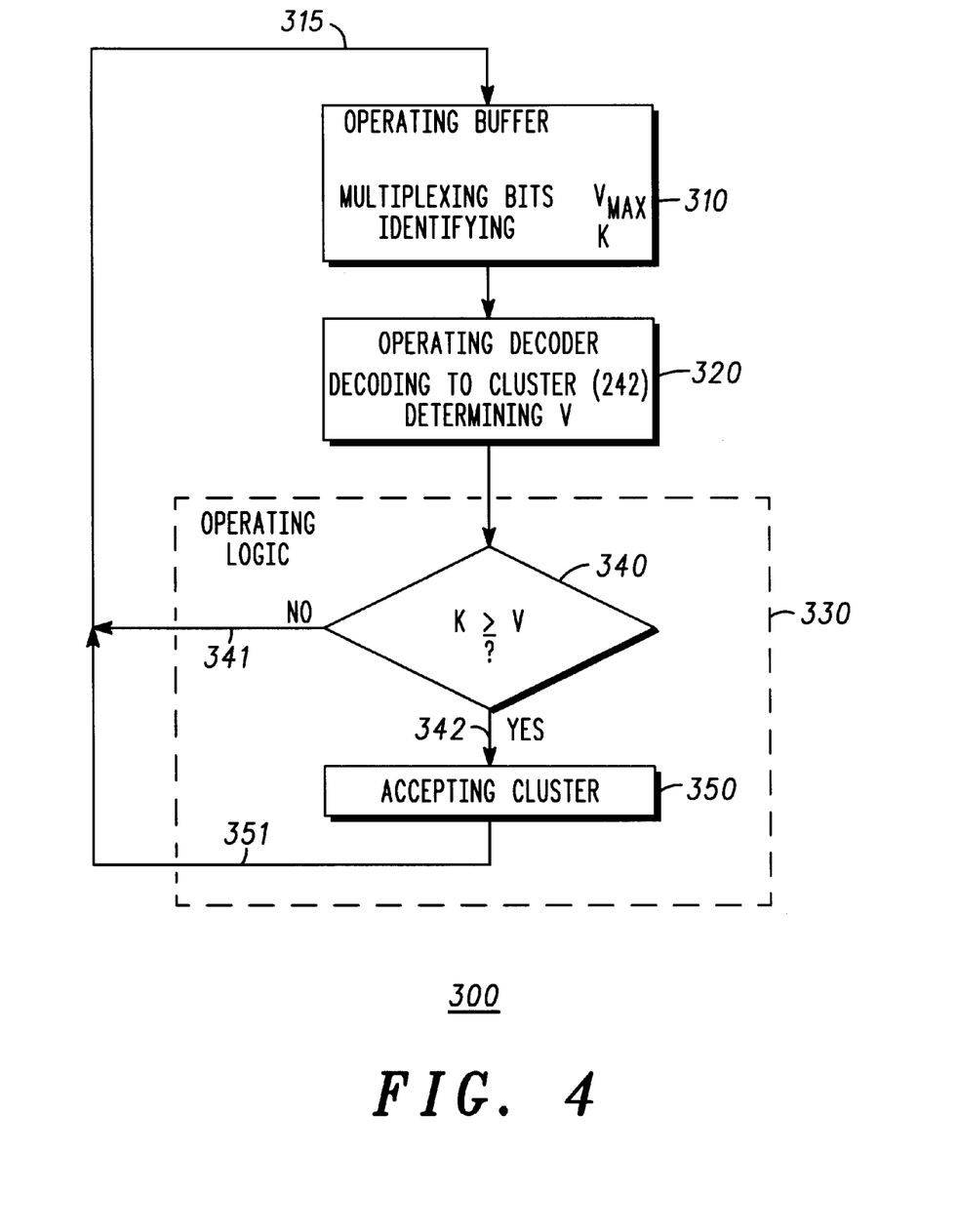

FIGS. 4–5 are simplified diagrams illustrating method 300 of the present invention to operate converter 130. As illustrated in the flow chart diagram of FIG. 4, method 300 comprises operating buffer step 310, operating decoder step 320, and operating logic step 330 (dashed frame) which are, preferably, executed consecutively. Arrows between the steps illustrate a preferred method flow. As indicated by arrow 315, steps 310 to 330 are, preferably, performed in repetitions. Operating logic step 330 comprises query step 340 and accepting cluster step 350.

Optionally, some steps can be executed simultaneously with different data sets. Pipelining is well known in the art, so that persons of skill in the art able, based on the description herein, to implement pipelining.

FIG. 5 illustrates bit stream 250 in buffer 410 with more detail by way of example. As the time progresses (time axis on the left side), stream 250 is modified to streams 250' and 250". The method flow is, preferably, in the order as explained hereinafter, but this is not important. Persons of skill in the art are able, based on the description herein, to modify method 300 without departing from the scope of the present invention. In the following, method 300 is explained by way of example without considering logical bit-values (i.e., "1" or "0"). Later, further details for this example are given in connection with a decoder look-up table.

In operating buffer step 310, buffer 410 receives code bits 232 from bus 120, concatenates code bits 232 to stream 250 by multiplexing, and provides $V_{MAX}$ bits in set 260. In repetitions of step 310, buffer 410 provides set 260 with a shift. Also, buffer 410 identifies K as the number of code bits 232 in set 260.

The example of FIG. 5 illustrates stream 250 with the first 19 bits. Position indices 0 to 18 are written at the top of each bit. The bits at positions 0 to 3 are code bits 232 which belong to code portion 222-1 (①-bits), the bits at positions 4 to 7 are code bits 232 which belong to code portion 222-2 (②-bits), and the bits at positions 8 to 18 are undefined bits 290 (Ø-bits). Preferably, buffer 410 does not consider this bit-to-portion assignment. It is only important, that buffer 410 distinguishes "valid" code bits 232 from "invalid" undefined bits 290. Set 260 has $V_{MAX}$=12 bits which are counted without any shift (from position 0 to position 11). Among the bits in set 260, set 295 has e.g., K=8 code bits 232 ((①-bits and ②-bits).

In operating decoder step 320, decoder 420 receives set 260 and determines code length V of the first code portion which is part of set 260. Decoder 420 also finds the corresponding cluster 426 by decoding 242 (see FIG. 2).

The example of FIG. 5 illustrates cluster 426 with U=8/①/-bits and V(1)=4 ①-bits for portion 222-1. In other words, decoder 420 detects in set 260, that the first V=4 code bits 232 belong to code portion 222-1 and finds a decompressed equivalent in cluster 426.

In operating logic step 330, comparator 440 compares K and V by query 340, that is:

$$K \geq V? \quad (4)$$

In other words, comparator 440 answers the question: "Does decoder 420 provide cluster 426 from valid code 232 bits only?". If "yes" (K≧V, line 342), converter 130 goes to accepting cluster step 350 in which output buffer 430 transfers cluster 426 as instruction portion 212 to processor 140 (via outputs 432). Method 300 continues (lines 351 and 315) at step 310. If "no" (K<V, line 341), converter 130 does not accept cluster 426 and continues at step 310 without providing instruction portion 222.

In the example of FIG. 5, comparator 440 confirms K=8≧V=4 (YES). Comparator 440 asserts enable signal (ENABLE=TRUE) and output buffer 430 copies cluster 426 as instruction portion 222-1 to processor 140 (U=8/①/-bits).

In a first repetition of method 300, converter 130 does the following: In buffer operating step 310, input buffer 410 receives further code bits 232 (Ø-bits at positions 8 to 11). New bit stream 250' has ①-bits at positions 0 to 3, ②-bits at positions 4 to 11, and Ø-bits at positions 12 to 18. Buffer 410 provides new bit set 260' with $V_{MAX}$=12 bits with a shift V=4. Buffer 410 has received V via input 415 and a shift request via ENABLE=TRUE at input 417. Buffer 410 has discarded the V=4 code bits 232 (①-bits) at positions 0 to 3. New bit set 260' has K=8 code bits 232 Ø-bits, positions 4 to 11) and $V_{MAX}$–K=4 undefined Ø-bits (positions 12 to 15). In operating decoder step 320, decoder determines code length V=11 and provides cluster 426' (U=8/②/-bits). In operating logic step 330, comparator 440 detects that K=8<V=11 (NO at line 341) and disables output buffer 430 (ENABLE=FALSE). Cluster 426' has resulted from bits which are partly unspecified (Ø-bits at positions 12 and 13). Therefore, converter 130 neglects cluster 426' (crossed out in FIG. 5) and decoder 130 repeats method 300 without accepting cluster 426' (step 350 skipped).

In a second repetition of method 300, input buffer 410 receives further code bits 232 (②-bits at positions 12 to 14, ③-bits at positions 15 to 18). New bit stream 250" now comprises 4 ①-bits at positions 0 to 3, 11 ②-bits at positions 4 to 14, and 4 ③-bits at positions 15 to 18. Buffer 410 provides new bit set 260" without a new shift (ENABLE=FALSE). New bit set 260" has K=12 valid code bits 232. Decoder 430 receives $V_{MAX}$=12 bits of set 260" and obtains cluster 426" (U=8/②/-bits) and calculates V=11. Comparator 440 confirms the validity of cluster 426" (YES, K=12≧V=11), enables output buffer 430, and thereby accepts cluster 426" (step 350) as instruction portions 212-2 (U=8/②/-bits not crossed out).

Persons of skill in the art can, optionally, modify method 300 by storing V when ENABLE=FALSE to avoid a re-calculation of V in the next repetition of step 320.

Table 1 illustrates, only by way of example, and not intended to be limiting, a portion of a look-up table which can be used by decoder 420. In table 1, column (1) illustrates instruction portion 212 with U=8 instruction bits 231; column (2) indicates corresponding code lengths V (e.g., $V_{MIN}$=4, $V_{MAX}$=12); and column (3) indicates corresponding code portions 222 with code bits 232. For simplicity, groups of four bits 231 in instruction portions 212 are separated by commas ",", and groups of three or less bits 232 in code portions 222 are separated by dots "." (cf. FIG. 2).

TABLE 1

Decoder Look-Up Table

| (1) instruction portion 212 | (2) V | (3) code portion 222 |
|---|---|---|
| 0011,1001 | 4 | 000.0 |
| 0100,0000 | 4 | 000.1 |
| ... | ... | ... |
| 0011,0100 | 9 | 111.101.100 |
| 0000,1100 | 11 | 111.101.101.00 |
| 0110,0101 | 11 | 111.101.101.01 |
| 0111,1110 | 10 | 111.101.101.1 |
| ... | ... | ... |

In the example, memory 110 stores code portion 222-1 with the following V(2)=4 code bits ①-bits $$①①①① = 000.1 \quad (5)$$

According to table 1, this combination of code bits 232 corresponds to code instruction portion 212-1 with U=8 instruction bits 231 as follows:

$$/①//①//①/①/,/①//①//①//①/ = 0100,0000 \quad (6)$$

Further, memory 110 stores code portion 222-2 with the following V(2)=11 code bits 232 (②-bits)

$$②②②.②②②.②②②.②② = 111.101.101.01 \quad (7)$$

corresponding to instruction portion 212-2 with U=8 instruction bits 231:

$$/②//②//②//②/,/②//②//②//②/ = 0110,0101 \quad (8)$$

Initially in method 300, buffer 410 forwards K=8 code bits 232 (all ①-bits and some ②-bits) and 4 undefined bits 290 (Ø-bits) to decoder 420 (cf. set 260 in FIG. 5). Looking e.g., from the left, decoder 420 identifies the bit combination starting with 000.1 as the only corresponding entry in table 1 and provides V=4 and cluster 426 (0100,0000). Since K=8 complies with "K≧V" (query 340), system 100 accepts cluster 426 as instruction portion 212-1 (0100, 0000).

In the first repetition of method 300, buffer 410 concatenates only K=8 code bits 232 from the V(2)=11 code bits 232 and undefined bits 290 (Ø-bits) to set 260' (cf. FIG. 5) and forward these $V_{MAX}$=12 bits (positions 4 to 11) to decoder 420. Decoder 420 does not have the information which of the bits in set 260' are valid code bits 232 and receives at random one of $2^4$=16 input combinations (random bits bold):

(combination 0) 111.101.100.000

(combination 1) 111.101.100.001

(combination 2) 111.101.100.010

(combination 3) 111.101.100.011

(combination 4) 111.101.100.100

(combination 5) 111.101.100.101

(combination 6) 111.101.100.110

(combination 7) 111.101.100.111 (9)

For combinations 0 to 7, decoder 420 provides cluster 426' as "0011, 0100" and determines V=9. Logic 450 does not accept cluster 426' because V=9 is larger than K=8 (query 340, NO-line).

(combination 8) 111.101.101.000

(combination 9) 111.101.101.001 (10)

For combinations 8 and 9, decoder 420 provides cluster 426' as "0000, 1100" and determines V=11. Logic 450 does not accept cluster 426' because V=11 is larger than K=8 (query 340, NO-line).

(combination 10) 111.101.101.010

(combination 11) 111.101.101.011 (11)

For combinations 10 and 11, decoder 420 provides cluster 426' as "0110, 0101" and determines V=11. Cluster 426' corresponds by chance to the original instruction portion but is also not accepted because V=11 (table column (3) is larger than K=8 (query 340, NO-line).

(combination 12) 111.101.101.100

(combination 13) 111.101.101.101

(combination 14) 111.101.101.110

(combination 15) 111.101.101.111 (12)

For combinations 12 to 15, decoder 420 provides cluster 426' as "0111, 1110) and determines V=11. However, cluster 426' is also not accepted because of V=10 (column (3)) is larger than K=8.

In the second repetition of method 300, decoder 420 receives $V_{MAX}$=K=12 code bits (all ②-bits, some ③-bits) in set 260" from buffer 410. Depending on the first code bit 232 in portion 222-3 (③-bit), set 260" can be:

111.101.101.010 (13)

or 111.101.101.011 (14)

For both combinations, decoder 420 finds only cluster 426" as "0110, 0101". Since, the acceptance condition (query 340, YES-line) is in compliance, system 100 forwards cluster 426" as instruction portion 212-2.

The present invention can also be described as system 100 which in repetitions (cf. line 315) converts code portions 222 of code bits 232 stored in memory 110 to corresponding instruction portions 212 for processor 140. System 100 comprises buffer 410, decoder 420, and logic 450. Buffer 410 receives code bits 232 from memory 110, concatenates code bits 232 with undefined bits 290 (e.g., Ø-bits) to bit stream 250, provides a first set 260 of $V_{MAX}$ bits of bit stream 250, and identifies a second set 295 of K of code bits in bit stream 250. Decoder 420 receives the first set 260 of $V_{MAX}$ bits (preferably, without considering K), determines a code length V, and decodes $V \leq V_{MAX}$ bits from the first set 260 of $V_{MAX}$ bits to intermediate cluster 426. Logic 450 transfers cluster 426 to instruction portion 222 when, at the time decoder 420 received the first set 260, the number K of bits in the second set was equal to or larger than the code length V.

Preferably, undefined bits 290 are code bits 232 of code portions 222 (e.g., ①-bits 0–3 in bit stream 250') previously transferred into instructions portions 212. In a further repetition (cf. line 315), buffer 410 shifts outputs 416 which couple bit stream 250 to decoder 420 by code length V and provides the new first set 260' of $V_{MAX}$ bits (e.g., ②-bits) excluding the V bits previously provided (e.g., ①-bits at positions 0–4). Conveniently, logic 450 has buffer 430 and comparator 440. Buffer 430 temporarily stores cluster 426 having U bits corresponding to U instruction bits 231 in each instruction portion 212. Comparator 440 receives K and V and selectively enables or disables (cf. ENABLE signal) buffer 430 to selectively transfer cluster 426 to instruction portion 212.

Further, the present invention is described as converter 130 converting (e.g., (i) decoding 242 or (ii) coding 241) first bit clusters of variable lengths V (e.g., portions 222 in case (i)) to second bit clusters (e.g., portions 212 in case (i)) of equal lengths (e.g., U). Converter 130 in cycles (a) receives the first bit clusters in parallel (cf. outputs 416, inputs 421) with $V_{MAX} \geq V$ bits from bit stream 250 together with ($V_{MAX}$–K) bits not belonging to the first bit cluster (e.g., bits at positions 8 to 11 in stream 250), (b) selects V bits from the $V_{MAX}$ bits and decodes the V bits to preliminary string 426 ("cluster"), (c) for K–V$\geq$0 (i.e., "YES" in query 340) forwards preliminary string 426 to the second cluster or otherwise continues with step (a). The first bit clusters represent the Huffman code of the second bit clusters. Converter 130 obtains the information to select the V bits from the Huffman code.

Preferably, system 100 is an embedded system. Converter 130 (with buffer 410, decoder 420, and logic 450) is integrated together with memory 110, bus 120 and processor 140 into a single monolithic semiconductor substrate.

As mentioned above, when the software program expressed by the plurality of instructions (words 210, portions 212) in memory 110 is executed by processor 140, system 100 fetches instruction portions 212 from memory 110 to bus 120. For memory addresses (i.e., for lines 115) changing by jump commands (program flow modification), fetching takes more time than for linearly incrementing addresses. It is an advantage of the present invention, that the operation of converter 130 is enhanced compared to earlier designs. Decoder 420 does not always have to wait until bit stream 250 has at least $V_{MAX}$ "valid" code bits. In the majority of cases, the code length V is equal to or smaller than the number of K available valid bit in stream 250 (V$\leq$K) so that logic 450 accepts (cf. step 350) clusters 426 even if buffer 410 is not sufficiently filled. If buffer 410 lags behind, decoding 242 is repeated until acceptable results are obtained.

Still further, the present invention is described as converter 130 with multiplex-buffer 410 at bus 120, decoder 420, output buffer 430 and comparator 440. Multiplex-buffer 410 forwards bit set 260 (e.g., $V_{MAX}$ bits) of Huffman coded portions 222 from bus 120 to decoder 410. Bit set 260 can comprise further bits 290 (Ø-bits) randomly at logical "1" or "0". On control output 414, multiplex-buffer 410 provides signal K identifying which bits of bit set 260 are valid or not valid. Decoder 420 maps bit set 260 into preliminary bit cluster 426 and indicates code length V regardless whether some or all bits in set 260 are valid or not. Comparator 440 checks V and K and allows output buffer 430 to copy cluster 426 into instruction portions 212 only when the code length fits the identification of valid bits.

Method 300 of the present invention can also be described as a method for transferring information (e.g., instructions, data) stored in a first form (e.g., compressed) by first structures (e.g., code portions 222) with variable numbers (e.g., V) of first bits (e.g., code bits 232) to information stored in a corresponding (e.g., one-to-one relation) second form (e.g., decompressed) by second structures (e.g., instruction portions 212) of second bits (e.g., instruction bits 231). The method comprises the following steps:

(1) Concatenating first bits (e.g., code bits 232, ①-bits, ②-bits, etc.) of the first structures (e.g., code portions 222) and further bits (e.g., undefined bits 290) to a first preliminary structure (e.g., bit set 260, bit stream 250), the first bits (e.g., code bits 232) selectively forming complete first structures (e.g., in set 260": ②-bits at positions 4 to 14) or forming incomplete structures (e.g., in set 260': ②-bits at positions 4 to 11 of incomplete code portion 222-2), and identifying the number (e.g., K) of first bits (e.g., code bits 232) in the first preliminary structure;

(2) Finding a second preliminary structure (e.g., cluster 426) of the second form (e.g., uncompressed) corresponding to any bit combination (e.g., whatever matches column (3) of table 1) of first bits (e.g., code bits) and further bits (e.g., undefined bits 290) without considering the number of first bits in the first preliminary structure and identifying the number (e.g., V) of bits in the first preliminary structure which are needed to find the second preliminary structure (cluster 426); and (3) While substantially keeping the second form unchanged (e.g., uncompressed) selectively (a) accepting the information in the second preliminary structure (e.g., cluster 426) as the information in the second structure (e.g., decompressed) only when in the first preliminary structure, the number of first bits equals or exceed the number of first and further bits needed to find the second preliminary structure (e.g., cluster 426), or otherwise (b) discarding the second preliminary structure (e.g., cluster 426) and repeating the method with more first bits.

While the invention has been described in terms of particular structures, devices and methods, those of skill in the art will understand based on the description herein that it is not limited merely to such examples and that the full scope of the invention is properly determined by the claims that follow.

What is claimed is:

1. A system which in repetitions converts code portions of code bits stored in memory to corresponding instruction portions, said system comprising:

a first buffer for receiving said code bits from said memory, for concatenating said code bits with undefined bits to a stream, for providing a first number of bits of said stream, and for identifying a second number of code bits in said stream;

a decoder for receiving said first number of bits, for determining a third number indicating a code length, and decoding a third number of bits from said first number of bits to an intermediate cluster; and a logic for transferring said intermediate cluster to said instruction portion when said second number was, at the time said decoder received said first number of bits, equal to or larger than said third number.

2. The system of claim 1 wherein said undefined bits represent code bits of code portions previously transferred into instructions portions.

3. The system of claim 1 wherein in a further repetition, said first buffer shifts outputs coupling said stream to said decoder by the third number and provides the first number of bits excluding the third number of bits previously provided.

4. The system of claim 1 wherein said logic comprises (a) a second buffer for temporarily storing said intermediate cluster with a fourth number of bits which corresponds to the number of instruction bits in each instruction portion, and (b) a comparator receiving said second number and said third number and selectively enabling or disabling said second buffer to selectively transfer said intermediate clusters to said instruction portions.

5. The system of claim 1 wherein said logic receives said second number and said third number and selectively enables or disables said first buffer to provide said first number of bits with a shift by the third number.

6. The system of claim 1 wherein said first buffer, said decoder, and said logic are integrated into a single monolithic semiconductor substrate.

7. The system of claim 1 wherein said decoder does not receive the identification of said second number of code bits from said first buffer.

8. A converter converting first bit clusters of variable lengths V to second bit clusters of equal lengths characterized in that said converter in cycles (a) receives said first bit clusters in parallel with $V_{MAX} \geqq V$ bits from a bit stream together with $(V_{MAX}-K)$ bits not belonging to said first bit cluster, (b) selects V bits from said $V_{MAX}$ bits and decodes the V bits to preliminary strings, (c) for $K-V \geqq 0$ forwards said preliminary string to said second cluster or otherwise continues with step (a).

9. The converter of claim 8 wherein said first bit clusters represent the Huffman code of said second bit clusters and wherein said converter obtains the information to select the V bits from the code.

10. The converter of claim 8 wherein said first bit clusters are code portions stored in a memory of a computer system and said second bit clusters are instructions portions which are executed by a processor of said computer system.

11. A Huffman code converter comprising:

a multiplex-buffer receiving code bits from a bus and forwarding a first number of bits, said first number of bits having bits set to logical values at random, said multiplex-buffer providing a signal to identify which bits of the first number of bits are valid;

a decoder mapping the first number of bits into a preliminary bit cluster and indicating a code length regardless whether some or all bits are valid; and a comparator checking the code length and said signal and allowing an output buffer to copy said preliminary bit cluster into instruction portions only when the code length fits the identification of valid bits.

12. A method for transferring information stored in a first form by first structures with variable numbers of first bits to information stored in a corresponding second form by second structures of second bits, said method comprising the following steps:

concatenating first bits of said first structures and further bits to a first preliminary structure, said first bits selectively forming complete first structures or forming incomplete structures, and identifying the number of first bits in said first preliminary structure;

finding a second preliminary structure of said second form corresponding to any bit combination of first bits and further bits without considering the number of first bits in said first preliminary structure and identifying the number of bits in said first preliminary structure which are needed to find said second preliminary structure; and while substantially keeping said second form unchanged selectively (a) accepting the information in said second preliminary form as said information in said second structure only when in said first preliminary structure, the number of first bits equals or exceed the number of first and further bits needed to find said second preliminary structure, or otherwise (b) discarding said second preliminary structure and repeating said method with more first bits.

* * * * *

UNITED STATES PATENT AND TRADEMARK OFFICE
CERTIFICATE OF CORRECTION

| | |
|---|---|
| PATENT NO. | : 6,178,496 B1 |
| DATED | : January 23, 2001 |
| INVENTOR(S) | : Rami Natan et al. |

It is certified that error appears in the above-identified patent and that said Letters Patent is hereby corrected as shown below:

Title Page
(75) Inventors: change "all of (IL)" to read --all of Israel--

Signed and Sealed this

Tenth Day of July, 2001

Attest:

NICHOLAS P. GODICI
*Attesting Officer*     *Acting Director of the United States Patent and Trademark Office*